(12) United States Patent
Schwertfeger et al.

(10) Patent No.: US 6,991,838 B2
(45) Date of Patent: *Jan. 31, 2006

(54) DOUBLE SIDED ADHESIVE TAPE FOR SEALING AND OPENING CARTONS OR CARTONLIKE PACKAGES

(75) Inventors: Michael Schwertfeger, Hamburg (DE); Olaf Görbig, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,968

(22) Filed: May 8, 2003

(65) Prior Publication Data

US 2005/0074571 A1    Apr. 7, 2005

(30) Foreign Application Priority Data

May 8, 2002    (DE) ................................ 102 20 835

(51) Int. Cl.
*B32B 3/02*    (2006.01)

(52) U.S. Cl. .................... 428/40.1; 53/375.8; 156/247; 428/41.9; 428/42.2; 428/42.3; 428/43; 428/57; 428/58; 428/192; 428/194

(58) Field of Classification Search ............... 428/40.1, 428/42.2, 42.3, 43, 192, 194, 57, 58, 41.9; 156/247; 53/375.8
See application file for complete search history.

(56) References Cited

U.S. PATENT DOCUMENTS

| | | | | |
|---|---|---|---|---|
| 4,622,260 A | | 11/1986 | Tesch .......................... | 428/173 |
| 5,098,786 A | * | 3/1992 | Hanke ......................... | 428/343 |
| 5,616,385 A | * | 4/1997 | Rothrum et al. ........... | 428/40.1 |
| 5,622,761 A | | 4/1997 | Cole ........................... | 428/41.9 |
| 6,689,244 B2 | * | 2/2004 | Schwertfeger .............. | 156/247 |

FOREIGN PATENT DOCUMENTS

| | | |
|---|---|---|
| DE | 43 13 008 C1 | 11/1994 |
| EP | 0 071 212 B1 | 2/1983 |
| EP | 0 578 151 A1 | 1/1994 |
| EP | 0 655 489 A1 | 5/1995 |
| JP | 409169370 | * 6/1997 |

* cited by examiner

*Primary Examiner*—Nasser Ahmad
(74) *Attorney, Agent, or Firm*—Norris McLaughlin & Marcus PA

(57) ABSTRACT

The use of a double sided adhesive tape for sealing and opening cartons or cartonlike packages, at least one of the two films of adhesive of the double sided adhesive tape being present applied in the lengthwise direction of the carrier material in the form of a strip which is present at least partially and which is narrower than the carrier material of the adhesive tape, the bonding of the adhesive tape between the two plies or flaps of the carton or of the cartonlike packages taking place in such a way that the part of the carrier material not covered by the film of adhesive is likewise situated between the two plies or flaps.

15 Claims, 2 Drawing Sheets

Figure 1:
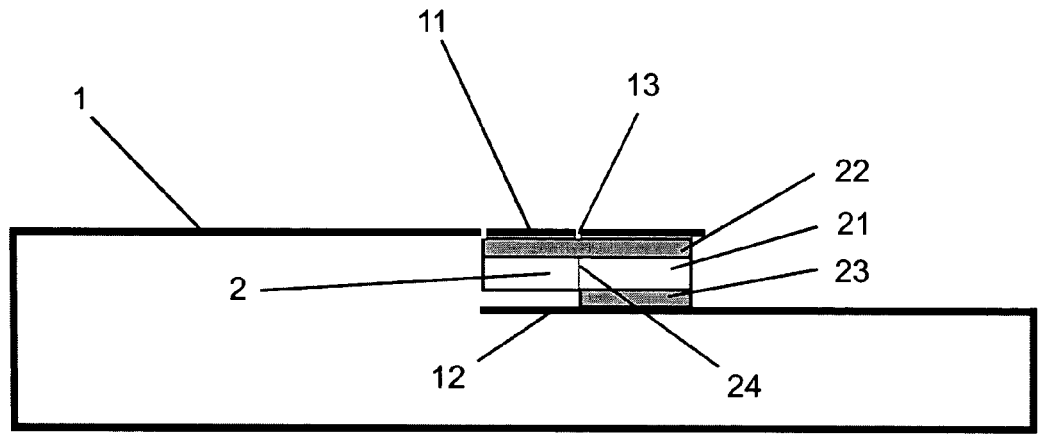

DOUBLE SIDED ADHESIVE TAPE FOR SEALING AND OPENING CARTONS OR CARTONLIKE PACKAGES

The invention relates to the use of a double sided adhesive tape for sealing and opening cartons or cartonlike packages.

With packages made of corrugated card in particular it is a problem to gain access to the contents again in a very simple way after the package has been adhesively sealed.

The normal way of gaining access is by disruptive cutting or tearing followed by removal of the part of the package that has been broken open. All of these methods are relatively time consuming and, in the case of disruptive cutting and/or tearing in particular, necessitate additional means, such as scissors, knives or keys, for example. Moreover, these means carry with them a risk of injury and/or a risk of damaging the contents.

Also known is the use of tear-open strips, made for example of plastic or in the form of a thin string, with which opening is effected by pulling and, in so doing, separating or tearing the package that is to be opened.

A common feature of all tear-open strips is that their sole purpose is to open the closed carton or package.

The known tear-open strips cannot be used first to seal the package and then to offer a means of opening; in other words, they are not able to constitute simultaneously a means of sealing and a means of opening.

Alternatively, double sided adhesive tapes are offered for secure sealing of a carton, but they do not offer any aid to tearing open.

It is an object of the present invention to provide a sealing tape for cartons or comparable packages which simultaneously offers an aid to opening; in other words, the combination of two hitherto completely separate functions in one solution.

This object is achieved by the use of a double sided adhesive tape for sealing and opening cartons or cartonlike packages. The subclaims provide advantageous developments of the subject matter of the invention.

The invention accordingly provides for the use of a double sided adhesive tape for sealing and opening cartons or cartonlike packages, at least one of the two films of adhesive of the double sided adhesive tape being present applied in the lengthwise direction of the carrier material in the form of a strip which is present at least partially and which is narrower than the carrier material of the adhesive tape.

The bonding of the adhesive tape between the two plies or flaps of the carton or of the cartonlike packages takes place in such a way that the part of the carrier material not covered by the film of adhesive is likewise situated between the two plies or flaps.

In one preferred embodiment the upper of the two films of adhesive is applied over the full area of the carrier material, while the lower film of adhesive is in the form of a strip which is present at least partially.

The first purpose of the adhesive tape is to seal the carton.

For this purpose, the release paper or release film covering the lower film of adhesive, i.e. the film preferably in the form of a strip which is present at least partially, is removed from the film of adhesive.

The adhesive tape is applied between two plies or flaps, of the carton or of the cartonlike packages, which it is desired to bond to one another, the bonding of the adhesive tape between the two plies or flaps taking place in such a way that the part of the carrier material which is not covered by the film of adhesive is likewise situated between the two plies or flaps.

For this the release paper or release film covering the second film of adhesive is removed where appropriate.

This ensures that the double sided adhesive tape first of all connects the two plies or flaps of the carton that form the seal firmly to one another so as to prevent the carton coming undone unintentionally. On the other hand, one part of at least one film of adhesive on the adhesive tape is not tacky.

The part not covered by the film of adhesive preferably extends, beginning at one edge of the carrier material, in the direction of the center of the carrier material.

It has proven particularly advantageous if the part not covered by the film of adhesive occupies 30% of the width of the adhesive tape; that is, if, based on the width of the adhesive tape, 70% is tacky. Further advantageous values of the part not covered with the film of adhesive are 50% or 70%.

It is of course within the expertise of the skilled worker to deviate upward or downward from the stated values if required by the case in hand.

With further preference the part not covered by the film of adhesive has a width of from 3 to 7 mm, in particular 5 mm.

In order to make the tear-open operation even easier, it may also be advantageous to continue the predetermined breakage point into the adhesive tape; in other words, for example, to weaken the backing material of the adhesive tape as well, in particular by splitting it.

As a result, even adhesive-tape carrier materials of very high tensile strength can be severed reliably during the tear-open operation.

The line of weakness in the carrier material of the adhesive tape, in one outstandingly designed embodiment of the adhesive tape, lies below the edge which results on one side of the carrier material between the adhesive-free strip and the adhesive coating.

In the case of the bonding of two flaps of a carton which are folded over one another, i.e., an upper flap and a lower flap, whose inside edges are each linked to the body of the carton while each of the outer edges extends freely, it should preferably be ensured that the adhesive-free strip lies on the lower flap of the carton in such a way that the strip is situated on the flap facing away from the outer edge, while the film of adhesive on the same side of the carrier material faces the outer edge of the lower flap of the cardboard packaging.

During tearing open, the adhesive tape splits and the upper flap does so at the same time, so that the part separated from the upper flap remains on the carrier material and is removed, so that the formerly bonded upper flap can be folded open.

The plies or flaps of the carton or of the cartonlike packages which lie against the strip not covered by the film of adhesive are preferably weakened, especially slit, above and/or below the strip.

The slit or slits produced usually by two incisions in the ply or flap or plies or flaps correspond preferably in width to approximately the width of the adhesive-free strip on the carrier material.

In order ultimately to open the carton again, i.e., to part the two plies or flaps, therefore, there are two advantageous methods.

The nonadhesive strip of the adhesive tape is unable to bond to the overlying or underlying ply or flap of the carton.

This strip therefore forms the first part of a grip tab which is particularly easily gripped if two slits are present in the flap or ply.

Depending on which ply or flap the adhesive-free strip of the adhesive tape lies, the user grasps a grip tab which is composed of part of the upper ply or flap and part of the adhesive tape. When the grip tab is pulled, the adhesive tape and the ply or flap of the carton that is to be parted are split.

Alternatively, the user grasps a grip tab which is composed of part of the upper ply or flap, part of the adhesive tape, and part of the lower ply or flap. When the grip tab is pulled, the adhesive tape and the upper and lower ply or flap of the carton that are to be parted are split.

In a preferred version, the carrier layer of the adhesive tape may be formed by films (for example, of PU, PE or PP, polyesters such as PET, PA), nonwovens, wovens, foams, metallized films, composite materials, cotton, laminates, foamed films, paper, etc. It is very advantageous if the carrier layer is easy to tear or separate.

A preferred carrier layer is a thermoplastic polyolefin film which is unoriented and includes at least one polyolefin from the group of the polyethylenes (for example, HDPE, LDPE, MDPE, LLDPE, VLLDPE, copolymers of ethylene with polar comonomers) and the group of the polypropylenes (for example, polypropylene homopolymers, random polypropylene copolymers or block polypropylene copolymers).

Preference is given to using mixtures of different suitable polyolefins in order to allow optimum setting of the mechanical and thermal properties and also gloss, extrusion behavior, adhesive anchorage, etc.

Materials which lend themselves outstandingly to use as films in accordance with the invention are monoaxially and biaxially oriented films based on polyolefins; films based on oriented polyethylene or oriented copolymers containing ethylene and/or polypropylene units.

Monoaxially oriented polypropylene is notable for its very high tensile strength and low stretch in the lengthwise direction and is used, for example, for producing strapping tapes. Particular preference is given to monoaxially oriented films based on polypropylene.

The thicknesses of the monoaxially oriented films based on polypropylene are preferably between 0.2 and 0.5 mm, in particular between 0.23 and 0.28 mm.

Monoaxially oriented films are primarily single-layer, although multilayer monoaxially oriented films can also be produced in principle. Known films of this kind predominantly comprise single-layer, two-layer and three-layer films, although the number of layers chosen may also be greater.

Additionally, particular preference is given to biaxially oriented films based on polypropylene, with a draw ratio in the lengthwise direction of between 1:4 and 1:9, preferably between 1:4.8 and 1:6, and a draw ratio in the transverse direction of between 1:4 and 1:9, preferably between 1:4.8 and 1:8.5.

Polyesters are polymers whose base building blocks are held together by ester linkages (—CO—O—). In accordance with their chemical structure, those known as homopolyesters can be divided into two groups:

the hydroxy carboxylic acid types (AB polyesters) and the dihydroxy dicarboxylic acid types (AA-BB polyesters).

The former are prepared from only a single monomer by, for example, polycondensation of an ω-hydroxycarboxylic acid 1 or by ring-opening polymerization of cyclic esters (lactones) 2, for example

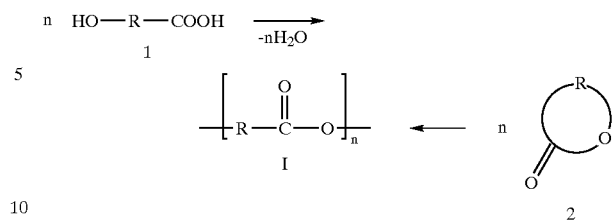

The latter, on the other hand, are synthesized by polycondensation of two complementary monomers, a diol 3 and a dicarboxylic acid 4 for example:

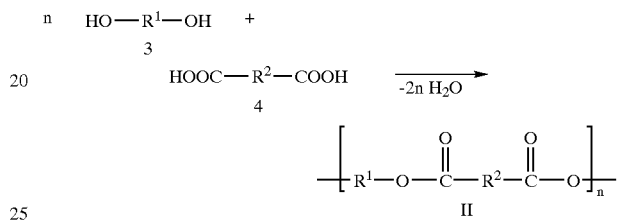

Branched and crosslinked polyesters are obtained in the polycondensation of trihydric or higher polyhydric alcohols with polyfunctional carboxylic acids. The polyesters are generally also considered to include the polycarbonates (polyesters of carbonic acid).

AB-type polyesters (I) include polyglycolic acids (polyglycolides, R=CH2), polylactic acids (polylactides, R=CH—CH3), polyhydroxybutyric acid [poly(3-hydroxybutyric acid), R=CH(CH3)—CH2], poly(ε-caprolactone)s [R=(CH2)5] and polyhydroxybenzoic acids (R=C6H4).

Purely aliphatic AA-BB-type polyesters (II) are polycondensates of aliphatic diols and dicarboxylic acids, which are used, inter alia, as products with terminal hydroxyl groups (as polydiols) for the preparation of polyester polyurethanes [for example, polytetramethylene adipate; R1=R2=(CH2)4].

Greatest industrial importance in volume terms is possessed by AA-BB-type polyesters made from aliphatic diols and aromatic dicarboxylic acids, especially the polyalkylene terephthalates [R2=C6H4, with polyethylene terephthalate (PET) R1=(CH2)2, polybutylene terephthalate (PBT) R1=(CH2)4 and poly(1,4-cyclohexanedimethyleneterephthalate)s (PCDT) R1=CH2-C6H10-CH2] as the most important representatives. These types of polyester can be broadly varied in their properties and adapted to different fields of application by using other aromatic dicarboxylic acids (for example, isophthalic acid) and/or by using mixtures of diols in the polycondensation.

Purely aromatic polyesters are the polyarylates, including poly(4-hydroxybenzoic acid) (formula I, R=C6H4), polycondensates of bisphenol A and phthalic acids (formula II, R1=C6H4-C(CH3)2-C6H4, R2=C6H4) or else those of bisphenols and phosgene.

An example of a suitable carrier layer is a metallocene polyethylene nonwoven.

The metallocene polyethylene nonwoven preferably has the following properties:

a basis weight of from 40 to 200 g/m², in particular from 60 to 120 g/m², and/or a thickness of from 0.1 to 0.6 mm, in particular from 0.2 to 0.5, and/or a lengthwise ultimate tensile stress elongation of from 400 to 700%, and/or a transverse tensile stress elongation of from 250 to 550%.

As carrier material for the adhesive tape it is then possible to use all known textile carriers such as wovens, knits or nonwoven webs; the term "web" embraces at least textile sheetlike structures in accordance with EN 29092 (1988) and also stitchbonded nonwovens and similar systems.

It is likewise possible to use spacer fabrics, including wovens and knits, with lamination. Spacer fabrics of this kind are disclosed in EP 0 071 212 B1. Spacer fabrics are matlike layer structures comprising a cover layer of a fiber or filament web, an underlayer and individual retaining fibers or bundles of such fibers between these layers, said fibers being distributed over the area of the layer structure, being needled through the particle layer, and joining the cover layer and the underlayer to one another. As an additional, though not mandatory, feature, the retaining fibers in accordance with EP 0 071 212 B1 comprise inert mineral particles, such as sand, gravel or the like, for example.

The holding fibers needled through the particle layer hold the cover layer and the underlayer at a distance from one another and are joined to the cover layer and the underlayer. Spacer wovens or spacer knits are described, inter alia, in two articles, namely an article from the journal kettenwirk-praxis 3/93, pages 59 to 63, "Raschelgewirkte Abstandsgewirke" [Raschel-knitted spacer knits]

and an article from the journal kettenwirk-praxis 1/94, pages 73 to 76, "Raschelgewirkte Abstandsgewirke", the content of said articles being included here by reference and being part of this disclosure and invention.

Suitable nonwovens include, in particular, consolidated staple fiber webs, but also filament webs, meltblown webs, and spunbonded webs, which generally require additional consolidation. Possible consolidation methods for webs are mechanical, thermal, and chemical consolidation. Whereas with mechanical consolidations the fibers are held together purely mechanically, usually by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to fiber nodal points, so that a stable, three-dimensional network is formed while retaining the loose, open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Meyer, formerly Malimo, and can be obtained, inter alia, from the companies Naue Fasertechnik and Techtex GmbH. A Malifleece is characterized in that a cross-laid web is consolidated by the formation of loops from fibers of the web.

The carrier used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheetlike structures. A web of this kind has been produced, inter alia, for many years, for example on stitchbonding machines of the "Kunitylies" type from the company Karl Meyer. A further characterizing feature of this web is that, as a longitudinal-fiber web, it is able to absorb high tensile forces in the longitudinal direction. The characteristic feature of a Multiknit web relative to the Kunit is that the web is consolidated on both the top and bottom sides by virtue of double-sided needle punching.

Finally, stitchbonded webs are also suitable as an intermediate for forming an adhesive tape of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly advantageous is a staple fiber web which is mechanically preconsolidated in the first step or is a wet-laid web laid hydrodynamically, in which between 2% and 50% of the web fibers are fusible fibers, in particular between 5% and 40% of the fibers of the web.

A web of this kind is characterized in that the fibers are laid wet or, for example, a staple fiber web is preconsolidated by the formation of loops from fibers of the web or by needling, stitching or air-jet and/or water-jet treatment.

In a second step, thermofixing takes place, with the strength of the web being increased again by the (partial) melting of the fusible fibers.

The web carrier may also be consolidated without binders, by means for example of hot embossing with structured rollers, with properties such as strength, thickness, density, flexibility, and the like being controllable via pressure, temperature, residence time, and embossing geometry.

For the inventive use of nonwovens, the adhesive consolidation of mechanically preconsolidated or wet-laid webs is of particular interest, it being possible for said consolidation to take place by way of the addition of binder in solid, liquid, foamed or paste-like form. A great diversity of theoretical embodiments is possible: for example, solid binders as powders for trickling in, as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for effecting specific changes in the surface properties.

Such a procedure is not only sparing in its use of binder but also greatly reduces the energy requirement for drying. Since no squeeze rolls are required and the dispersion remains predominantly in the upper region of the web material, unwanted hardening and stiffening of the web can largely be avoided.

For sufficient adhesive consolidation of the web carrier, the addition of binder in the order of magnitude of from 1% to 50%, in particular from 3% to 20%, based on the weight of the fiber web, is generally required.

The binder may be added as early as during the manufacture of the web, in the course of mechanical preconsolidation, or else in a separate process step, which may be carried out in line or off line. Following the addition of a binder it is necessary temporarily to generate a state in which the binder becomes adhesive and adhesively connects the fibers—this may be achieved during the drying, for example, of dispersions, or else by heating, with further possibilities for variation existing by way of areal or partial application of pressure. The binder may be activated in known drying tunnels, or else, given an appropriate selection of binder, by means of infrared radiation, UV radiation, ultrasound, high-frequency radiation or the like.

For the subsequent end use it is sensible, although not absolutely necessary, for the binder to have lost its tack following the end of the web production process.

A further, special form of adhesive consolidation consists in activating the binder by incipient dissolution or swelling. In this case it is also possible in principle for the fibers themselves, or admixed special fibers, to take over the function of the binder. Since, however, such solvents are objectionable on environmental grounds, and/or are problematic in their handling, for the majority of polymeric fibers, this process is not often employed.

Starting materials envisaged for the textile carrier include, in particular, polyester, polypropylene, viscose or cotton fibers. The present invention is, however, not restricted to said materials; rather it is possible to use a large number of other fibers to produce the web, as is evident to the skilled worker without any need for inventive activity.

Knitted fabrics are produced from one or more threads or thread systems by intermeshing (interlooping), in contrast to woven fabrics, which are produced by intersecting two thread systems (warp and weft threads), and nonwovens (bonded fiber fabrics), where a loose fiber web is consolidated by heat, needling or stitching or by means of water jets.

Knitted fabrics can be divided into weft knits, in which the threads run in transverse direction through the textile, and warp knits, where the threads run lengthwise through the textile. As a result of their mesh structure, knitted fabrics are fundamentally pliant, conforming textiles, since the meshes are able to stretch lengthways and widthways, and have a tendency to return to their original position. In high-grade material, they are very robust.

It is of very great importance for the carrier material overall that it can be split in the lengthwise direction, i.e., in the running direction of the adhesive tape.

It is also very advantageous if the adhesive applied over the full area of the carrier material is also splittable.

As a self-adhesive composition use is made in particular of a commercially customary, pressure sensitive adhesive based on PU, acrylate or rubber.

An adhesive which has proven particularly advantageous is one based on acrylate hotmelt having a K value of at least 20, in particular more than 30, obtainable by concentrating a solution of such a composition to give a system which can be processed as a hotmelt.

Concentration may take place in appropriately equipped tanks or extruders; particularly in the case of accompanying devolatilization, a devolatilizing extruder is preferred.

An adhesive of this kind is set out in DE 43 13 008 A1, whose content is hereby referenced and is part of this disclosure and invention. In an intermediate step, the solvent is removed completely from the acrylate compositions prepared in this way.

In addition, further volatile constituents are removed. After coating from the melt, these compositions contain only small fractions of volatile constituents. Accordingly, it is possible to adopt all of the monomers/formulas claimed in the above-cited patent. A further advantage of the compositions described in the patent is that they have a high K value and thus a high molecular weight. The skilled worker is aware that systems with relatively high molecular weights may be crosslinked more efficiently. Accordingly, there is a corresponding reduction in the fraction of volatile constituents.

The solution of the composition may contain from 5 to 80% by weight, in particular from 30 to 70% by weight, of solvent.

It is preferred to use commercially customary solvents, especially low-boiling hydrocarbons, ketones, alcohols and/or esters.

Preference is further given to using single-screw, twin-screw or multiscrew extruders having one or, in particular, two or more devolatilizing units.

The adhesive based on acrylate hotmelt may contain copolymerized benzoin derivatives, such as benzoin acrylate or benzoin methacrylate, for example, acrylates or methacrylates. Benzoin derivatives of this kind are described in EP 0 578 151 A1.

The adhesive based on acrylate hotmelt may alternatively be chemically crosslinked.

In one particularly preferred embodiment, self-adhesive compositions used comprise copolymers of (meth)acrylic acid and esters thereof having from 1 to 25 carbon atoms, maleic, fumaric and/or itaconic acid and/or their esters, substituted (meth)acrylamides, maleic anhydride, and other vinyl compounds, such as vinyl esters, especially vinyl acetate, vinyl alcohols and/or vinyl ethers.

The residual solvent content should be below 1% by weight.

One adhesive indicated as particularly suitable is a low molecular mass, pressure sensitive acrylic hotmelt adhesive, such as that carried under the designation acResin UV or Acronal®, especially Acronal DS 3458, by BASF. This low-K adhesive acquires its application-oriented properties as a result of a final, radiation-chemically initiated crosslinking process.

The intention of the text below is to illustrate the invention with reference to a number of figures, without wishing thereby to subject the invention to any unnecessary restrictions.

Figure 2:
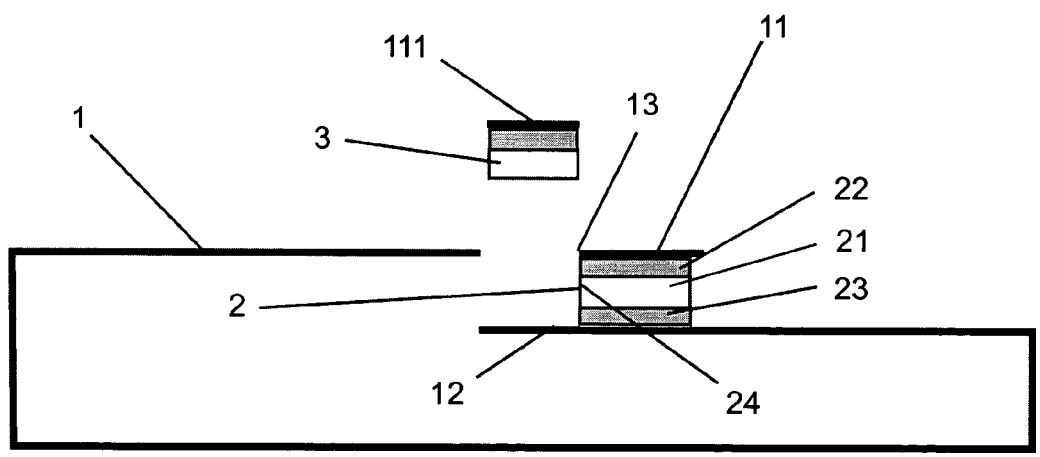
Figure 3:
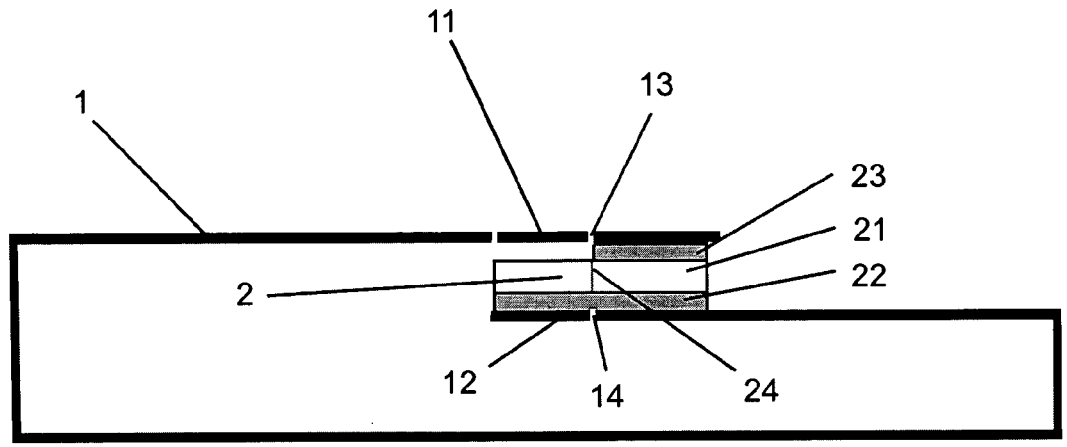
Figure 4:
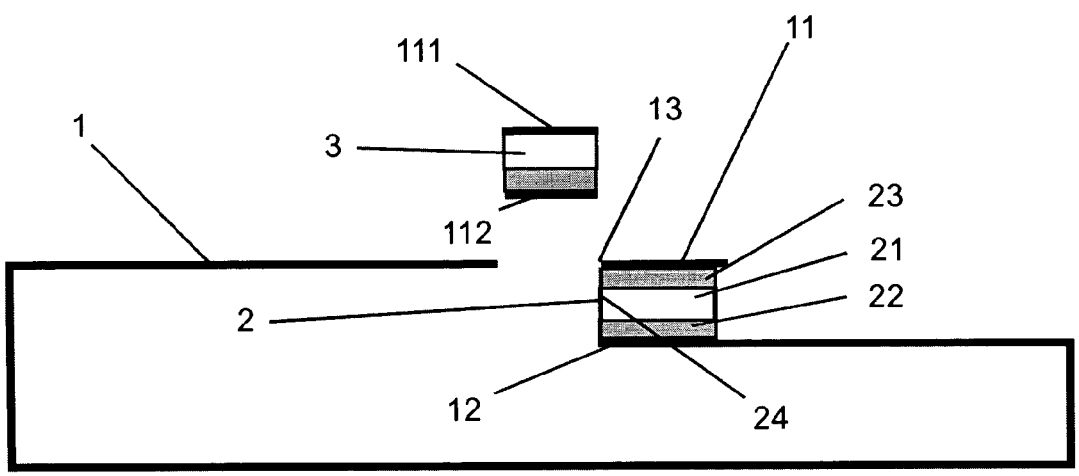

FIG. 1 shows a double sided adhesive tape of the invention for sealing and opening cartons or cartonlike packages in the course of its use as a sealing tape for a carton, FIG. 2 shows the double sided adhesive tape shown in FIG. 1 in the course of its use as an opening aid for a carton, FIG. 3 shows a double sided adhesive tape of the invention for sealing and opening cartons or cartonlike packages in the course of its use as a sealing tape for a carton, the adhesive tape being employed in an alternative mode as compared with the adhesive tape of FIG. 1, and FIG. 4 shows the double sided adhesive tape shown in FIG. 3 in the course of its use as an opening aid for a carton.

FIG. 1 shows a double sided adhesive tape 2 of the invention for sealing and opening a carton 1, which is depicted in highly stylized form in a side sectional view.

The adhesive tape 2 is composed of a carrier layer 21, which is provided on both the top and bottom sides with an adhesive coating 22 and 23, respectively.

The lower adhesive coating 23 is applied not over the full area but only partially, so that an adhesive-free strip is present on the carrier material 21.

A feature of the adhesive tape 2 of the invention is that the upper of the two films of adhesive, 22 and 23, of the double sided adhesive tape 2 is applied over the full area, while the lower film of adhesive is applied partially.

The bonding of the adhesive tape 2 is accomplished such that the adhesive-free strip lies on the lower flap 12 of the carton 1 in such a way that the strip lies on the side of the flap 12 that faces the outer edge, while the film 23 of adhesive faces away from the outer edge of the lower flap 12 of the cardboard packaging 1.

The bonding of the adhesive tape 2 between the two flaps 11 and 12 of the carton 1 therefore takes place in such a way that the adhesive-free strip on the carrier material 21 is likewise situated between the two flaps 11 and 12.

Accordingly, the sealing of the carton 1 is ensured by virtue of the facts that the full-area upper film 22 of adhesive is bonded firmly to the upper flap 11 of the carton 1 and that at the same time the lower film 23 of adhesive adheres to the lower flap 12 of the carton 2.

In order to make the operation of opening easier later on, the carrier material 21 of the adhesive tape 2 is weakened by means of a line 24 of weakness, in particular a slot.

As a result, even highly tensile carrier materials 21 of the adhesive tape 2 can be severed reliably in the course of the tear-open operation.

The line of weakness in the carrier material 21 of the adhesive tape 2 is above the edge which results on the lower side of the carrier material 21 between the adhesive-free strip and the adhesive coating 23.

Furthermore, the upper flap 11 of the carton 1 is likewise impaired in its stability by means of two lines 13 of weakness.

The distance between the slits 13 produced by two incisions in the upper flap 11 corresponds approximately to the width of the adhesive-free strip on the carrier material 21.

FIG. 2 discloses the double sided adhesive tape shown in FIG. 1 in the course of its use as an opening aid for a carton.

The carton is torn open by pulling on the carrier material 21, specifically at a point at which the adhesive-free strip is located, leading to the splitting of the carrier material 21 and of the upper flap 11 of the carton 1.

This produces a tear-open strip 3 which is composed of a part 111 of the upper flap 11, a part of the split adhesive composition 22, and a part of the split carrier material 21.

As a result of the splitting the flap 11 is separated in such a way that the outer part of the flap 11 continues to be bonded to the lower flap 12 by the residual adhesive tape 2.

Now the formerly bonded flap 11 can be folded open.

FIG. 3 shows a double sided adhesive tape 2 of the invention for sealing and opening a carton 1 in the course of its use as a sealing tape for a carton 1, the adhesive tape 2 being employed in an alternative mode as compared with the adhesive tape 2 of FIG. 1.

The bonding of the adhesive tape 2 takes place such that the adhesive-free strip lies below the upper flap 11 of the carton 1 in such a way that the strip lies on the side of the flap 11 that faces the outer edge, while the film 23 of adhesive faces away from the outer edge of the upper flap 11 of the cardboard packaging 1.

Furthermore, the lower flap 12 of the carton 1 is likewise impaired in its stability by means of a line 14 of weakness.

In FIG. 4 the double sided adhesive tape of the invention in FIG. 3 is depicted in the course of its use as an opening aid for a carton.

The carton is torn open by pulling on the lower flap 12, leading to the splitting of the carrier material 21, of the upper flap 11 of the carton 1, and of the lower flap 12.

This produces a tear-open strip 3 which is composed of a part 111 of the upper flap 11, of a part 112 of the lower flap 12, of a part of the split adhesive composition 22, and of a part of the split carrier material 21.

As result of the splitting the flap 11 and the flap 12 are separated in such a way that the outer part of the flap 11 continues to be bonded to the lower flap 12 by the residual adhesive tape 2.

The formerly bonded flap 11 can now be folded open.

What is claimed is:

1. A combination comprising:
   (a) a package comprising two overlapping plies or two overlapping flaps; and
   (b) a single double-sided adhesive tape adhered between the two overlapping plies or between the two overlapping flaps in such a way that one side of the double-sided adhesive tape is adhered to a first of the two overlapping plies or a first of the two overlapping flaps and another side of the double-sided adhesive tape is either adhered to or capable of being adhered to a second of the two overlapping plies or to a second of the two overlapping flaps;

wherein the double-sided adhesive tape comprises a carrier material which has a line of weakness which is covered on one face thereof with a first adhesive film strip, and on a second face thereof with a second adhesive film strip, at least one of said first or second adhesive film strips being narrower in width than the carrier material, so that a lengthwise portion of at least one face of the carrier material is adhesive-free, the lengthwise portion that is adhesive-free being situated between the two overlapping plies or between the two overlapping flap, said adhesive-free portion is the portion between the line of weakness in the carrier and an edge of the carrier, wherein the lengthwise portion that is adhesive-free is situated next to a portion of one of the two overlapping plies or to a portion of one of the two overlapping flaps, and said portion of the plies or said portion of the flaps is weakened, and wherein the portion of the plies or the portion of the flaps is weakened over a width corresponding to the width of the lengthwise portion that is adhesive-free.

2. The combination according to claim 1, wherein the package is a carton.

3. The combination according to claim 1, wherein the lengthwise portion that is adhesive-free has a width of from 3 to 7 mm.

4. The combination according to claim 3, wherein the lengthwise portion that is adhesive-free has a width of about 5 mm.

5. The combination according to claim 1, wherein the lengthwise portion that is adhesive-free occupies 30% of the width of the double-sided adhesive tape.

6. The combination according to claim 1, wherein the carrier material is split along its thickness along the line of weakness.

7. The combination according to claim 1, wherein the carrier material is composed of a tensile material suitable as a tear-open strip and/or is composed of a material which is easy to separate in a lengthwise direction.

8. The combination according to claim 7, wherein the carrier material is composed of (a) a tensile material suitable as a tear-open strip selected from the group consisting of MOPP and filament web and/or of (b) a material which is easy to separate in the lengthwise direction selected from the group consisting of MOPP, filament web and PET.

9. The combination according to claim 1, wherein one side of said double-sided adhesive tape is adhered to a first of the two overlapping plies or to a first of the two overlapping flaps and another side of said double-sided adhesive tape is covered with a release film.

10. The combination according to claim 9, wherein the package is a carton.

11. A method of sealing and thereafter opening a package, said method comprising the following steps:
  (a) providing a combination according to claim 9;
  (b) removing the release film from said another side of said double-sided adhesive tape, and adhering said another side of said double-sided adhesive tape to a second of the two overlapping plies or to a second of the two overlapping flaps to seal the package; and
  (c) grasping at least a portion of the double-sided adhesive tape and pulling to tear open the package.

12. The method according to claim 11, wherein the package is a carton.

13. The method according to claim 11, wherein the carrier material is split along its thickness along the line of weakness.

14. The method according to claim 11, wherein the carrier material is composed of a tensile material suitable as a tear-open strip and/or is composed of a material which is easy to separate in a lengthwise direction.

15. The method according to claim 14, wherein the carrier material is composed of (a) a tensile material suitable as a tear-open strip selected from the group consisting of MOPP and filament web and/or of (b) a material which is easy to separate in the lengthwise direction selected from the group consisting of MOPP, filament web and PET.

* * * * *